(12) United States Patent
Jacquemard et al.

(10) Patent No.: US 11,591,970 B2
(45) Date of Patent: Feb. 28, 2023

(54) ASSEMBLY FOR RETAINING A GEAR TRAIN IN A TURBOMACHINE

(71) Applicant: SAFRAN AIRCRAFT ENGINES, Paris (FR)

(72) Inventors: Christophe Paul Jacquemard, Moissy-Cramayel (FR); Didier Gabriel Bertrand Desombre, Moissy-Cramayel (FR); François Marie Paul Marlin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 171 days.

(21) Appl. No.: 16/971,106

(22) PCT Filed: Feb. 18, 2019

(86) PCT No.: PCT/FR2019/050364
§ 371 (c)(1),
(2) Date: Aug. 19, 2020

(87) PCT Pub. No.: WO2019/158883
PCT Pub. Date: Aug. 22, 2019

(65) Prior Publication Data
US 2020/0378311 A1   Dec. 3, 2020

(30) Foreign Application Priority Data
Feb. 19, 2018  (FR) ........................ 1851411

(51) Int. Cl.
*F02C 7/36*   (2006.01)
*F02C 7/32*   (2006.01)

(52) U.S. Cl.
CPC ............... *F02C 7/36* (2013.01); *F02C 7/32* (2013.01); *F05D 2230/642* (2013.01);
(Continued)

(58) Field of Classification Search
CPC ...... F02C 7/20; F02C 7/36; F02C 7/32; F05D 2260/36; F05D 2260/40311;
(Continued)

(56) References Cited

U.S. PATENT DOCUMENTS 5,433,674 A   7/1995  Sheridan et al.
6,142,033 A * 11/2000  Beigang ................ F16D 1/06
                                                 74/460

(Continued)

FOREIGN PATENT DOCUMENTS

WO   WO 2013/130373 A1   9/2013
WO   WO-2013130373 A1 *  9/2013 ............. F01D 25/16

OTHER PUBLICATIONS

International Patent Application No. PCT/FR2019/050364, International Search Report and Written Opinion dated Jun. 7, 2019, 18 pgs.

*Primary Examiner* — Brian P Wolcott
*Assistant Examiner* — Joshua R Beebe
(74) *Attorney, Agent, or Firm* — Lathrop GPM LLP (57) ABSTRACT

The invention relates to an assembly for holding an epicyclic gear train in a turbomachine comprising an annular housing in which are engaged a first annular part and a second annular part which are locked against rotation in the housing by first annular interlocking means and second annular interlocking means, respectively, wherein the first annular interlocking means are configured to allow a first circumferential clearance between the first annular part and the housing, the second annular interlocking means are configured to allow a second circumferential clearance between the second annular part and the housing, and the first circumferential clearance is strictly less than the second circumferential clearance.

20 Claims, 5 Drawing Sheets

(52) U.S. Cl.
CPC ...... *F05D 2240/90* (2013.01); *F05D 2260/36* (2013.01); *F05D 2260/40311* (2013.01); *F05D 2300/501* (2013.01)

(58) Field of Classification Search
CPC ........... F05D 2230/60; F05D 2230/642; F05D 2300/501; F05D 2240/90; Y02T 50/671; F01D 15/12; F01D 25/164; F01D 25/24; F01D 25/28
See application file for complete search history.

(56) References Cited

U.S. PATENT DOCUMENTS

| | | | |
|---|---|---|---|
| 6,338,578 B1* | 1/2002 | Adde | F16C 35/073 384/906 |
| 7,736,083 B2* | 6/2010 | Lescure | F16D 1/101 403/359.1 |
| 10,267,176 B2* | 4/2019 | Otto | F01D 15/12 |
| 2013/0195604 A1* | 8/2013 | Otto | F01D 25/162 415/124.2 |
| 2016/0369648 A1* | 12/2016 | Otto | F02C 7/20 |
| 2017/0122426 A1 | 5/2017 | Miller et al. | |

* cited by examiner

ASSEMBLY FOR RETAINING A GEAR TRAIN IN A TURBOMACHINE

CROSS-REFERENCE TO RELATED APPLICATIONS

This application is a 35 U.S.C. § 371 filing of International Application No. PCT/FR2019/050364 filed Feb. 18, 2019, which claims the benefit of priority to French Patent Application No. 1851411 filed Feb. 19, 2018, each of which is incorporated herein by reference in its entirety.

FIELD OF THE INVENTION

The present invention concerns devices for holding a reduction gear in a turbomachine as well as that of gear trains with an epicyclic configuration.

BACKGROUND OF THE INVENTION

Classically, an epicyclic gear train consists of planet pinions meshing with an outer ring gear or outer sun gear and a centre pinion or internal sun gear. The planet gears are carried by a planet carrier and mounted freely rotatably on pivots. Such an epicyclic gear train can be used in particular for the power transmission from a drive shaft such as the shaft of a low-pressure compressor, to a fan wheel via a central pinion supported by the shaft. In a possible operating configuration, the satellite carrier is fixed in rotation and the central pinion and outer crown are driving and driven, respectively. This assembly is commonly known as planetary reduction gear. With such an arrangement it is possible, for example, in a turbomachine to drive the fan wheel connected to the ring gear via the shaft of the low-pressure compressor.

However, the integration of a reduction gear into a turbomachine poses several difficulties. Firstly, the connection of the reduction gear, i.e. the planet carrier, to the housing must be made with a certain flexibility to limit disturbances within the reduction gear, i.e. to limit premature damage to the teeth, and also to filter out any vibrations propagating in the transmission chain, for example. Secondly, it must be possible for a high torque to be taken up by the housing under normal conditions, but also under extreme operating conditions. The two above-mentioned points are thus clearly contradictory and are therefore generally a compromise in the reduction gear mounting architecture. However, these two functions make it possible to ensure both optimum behaviour of the reduction gear and satisfactory mechanical strength of the connection between the reduction gear and the housing. Thirdly, it is necessary that the architecture selected allows good accessibility for mounting and maintenance of the reduction gear in its environment.

In general, compliance with the constraints set out in the previous paragraph requires changes to the shape of the radius and thickness of the housing walls, which increase the overall dimensions of the housing. In complex cases, the integration of the reduction gear may make it difficult to assemble and/or disassemble it.

The invention set out below offers a solution that solves the above-mentioned problems while being simple and economical to implement.

SUMMARY OF THE INVENTION

The present invention relates firstly to an assembly for holding an epicyclic gear train in a turbomachine comprising an annular housing in which are engaged a first annular part and a second annular part which are locked against rotation in the housing by first annular interlocking means and second annular interlocking means, respectively, wherein
   the first annular interlocking means are configured to allow a first circumferential clearance between the first annular part and the housing;
   the second annular interlocking means are configured to allow a second circumferential clearance between the second annular part and the housing;
   the first circumferential clearance is strictly less than the second circumferential clearance.

According to the invention, two separate annular parts are used to connect the housing to an epicyclic gear train such as a reduction gear, more particularly to connect the housing to the planet carrier in a so-called planetary reduction gear configuration. Each of the first and the second ring section allow the take-up of forces resulting from the operation of the gear train. In normal operation, the first annular part ensures the passage of the torque due to a first circumferential clearance which is smaller than the second circumferential clearance. When the torque exceeds a certain limit, the second part is used to transfer the forces. The second part can thus be designed and dimensioned to take up torques above this limit value. This specific torque passage pattern is made possible by a dedicated connection of each of the first and second annular part to the housing and by the dimensioning of the circumferential clearances as mentioned above.

It is also understandable that the use of interlocking means makes it easier to mount the first and second parts in the annular housing compared to bolted connections as in the previous technique.

Specifically, the first interlocking means may be dimensioned so that the first circumferential clearance is between 0 and 0.2 mm and preferably less than 0.1 mm. The second means of interlocking may be dimensioned so that the second circumferential clearance is between 0.5 and 2 mm.

Preferably, the first annular part has an axial rigidity and a circumferential rigidity lower, respectively, than the axial rigidity and the circumferential rigidity of the second annular part. In this way, when the torque exceeds a threshold value, the second annular part can more easily take up the torque and direct it towards the housing.

When the first part and the second part are connected to the planet carrier of an epicyclic configuration gear train, the first part has sufficient radial flexibility to limit torque overloads transmitted by the gear train to the planet carrier. The second part has sufficient stiffness to withstand occasional torque excesses.

In a particular embodiment, the first part comprises at least one annular bulge which can be formed between the first engaging means and an opposite annular flange for attachment to an external sun gear of an epicyclic gear train.

Also, the first annular part and the second annular part are fixed to each other by annular flanges axially opposite to the first interlocking means and the second interlocking means.

In a particular embodiment of the invention, the first means of circumferential interlocking include:
   a plurality of series of axial ribs or axial grooves, said series being circumferentially spaced and formed on one of the first part and the housing, and
   a plurality of series of axial ribs, said series being circumferentially spaced and formed on one of the other part and the annular housing.

It is understood that the term ribs refers to grooves, i.e. hollow parts made in one of the first part and the housing that the term ribs refers to suitable solid parts delimited circumferentially by the hollow parts.

In another embodiment of the invention, the first circumferential interlocking means could comprise solid parts or teeth projecting radially outwardly and evenly spaced around the axis of the first part, the number of teeth being, for example, equal to eight. They may have a substantially rectangular cross-section and cooperate with hollow parts carried by the annular housing.

In the assembly according to the invention, the second annular part is radially interposed between the first annular part and an annular housing shell.

Also, the assembly may comprise a third annular part annularly interposed between the second annular part and the housing and preferably having axial arms bolted to the first annular part. This third annular part enables the reduction gear inside the assembly to be held axially in place by means of a connection which is accessible from the end of the assembly carrying the interlocking means. This makes it possible to have a quick and direct assembly and disassembly of the gear train from the front of the motor without having to disassemble other parts. The fixing of the third part to the first part and not to the second part makes it possible to maintain a good rigidity to the assembly formed by the first part, the second part and the third part due to the fact that the first circumferential clearance is strictly less than the second circumferential clearance.

The invention also relates to an assembly comprising a gear train of an aircraft gas turbomachine, comprising an outer sun gear and planet pinions meshing with an inner sun gear and with the outer sun gear and each freely rotatably mounted on a planet carrier. The first and second annular torque take-up ring parts in normal and critical situations are thus connected to the reduction gear by means of interlocking means.

The invention also relates to an aircraft gas turbomachine comprising a gear train, the central pinion of which surrounds and is rotationally integral with a compressor shaft (30) of the turbomachine.

The invention will be better understood and other details, characteristics and advantages of the invention will appear when reading the following description, which is given as a non-limiting example, with reference to the attached drawings.

BRIEF DESCRIPTION OF THE FIGURES

FIG. 4A is a schematic view, in perspective, of a first annular part of the assembly according to the invention;

FIG. 4B is a perspective schematic view of the first annular part in

FIG. 5 with a partial pull-out;

DETAILED DESCRIPTION

Figure 1:
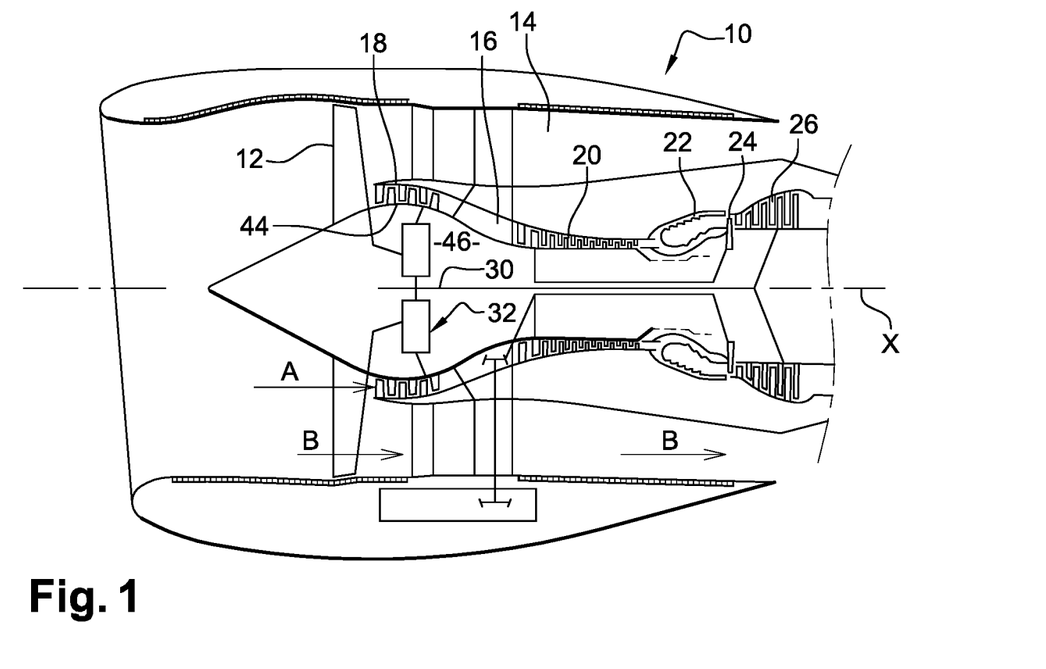
FIG. 1 is a schematic view, in perspective, of a turbomachine according to the known technique.

Reference is made first of all to FIG. 1, which shows a schematic view of a turbomachine 10, as known, comprising in an upstream- downstream direction, a fan wheel 12 whose rotation induces acceleration of air in an annular secondary air stream 14 (air flow B) surrounding successively an annular primary air stream 16 (air flow A) flowing into a low-pressure compressor 18, a high-pressure compressor 20, an annular combustion chamber 22, a high-pressure turbine 24 and a low-pressure turbine 26. Classically, the low-pressure turbine 26 rotates the rotor 30 of the low-pressure compressor, which is connected to the fan wheel 12. However, in order to limit the rotational speed of the fan wheel 12 in relation to the rotational speed of the rotor 30 of the low-pressure compressor 18, it is known to mount an epicyclic gear train 32 radially inside the low-pressure compressor 18, this epicyclic gear train 32 being referred to as a reduction gear due to its speed-reducing function.

Figure 2:
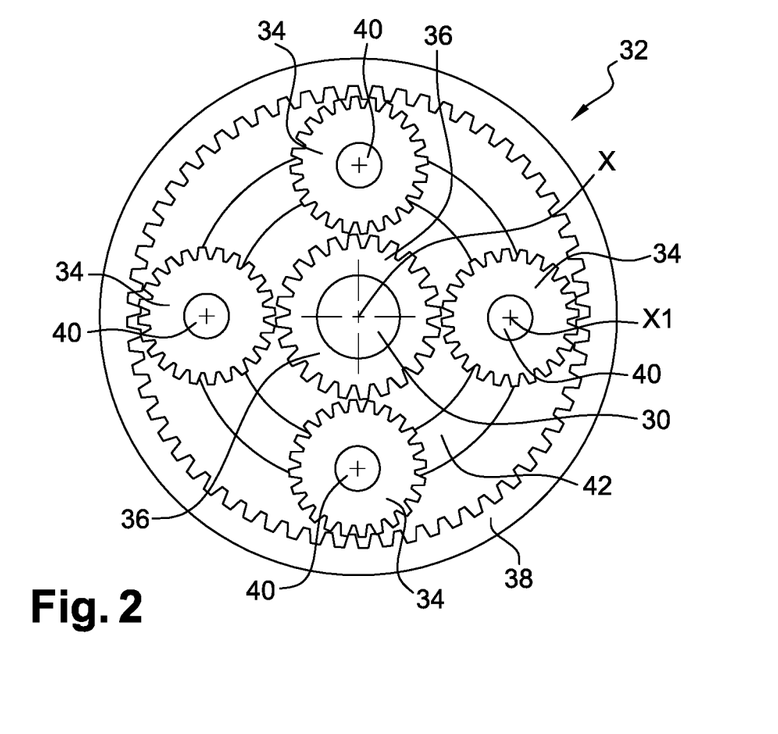
FIG. 2 is a cross-sectional schematic view of an epicyclic gear train intended to be used in a turbomachine of FIG. 1.

Such a gear train 32 comprises planet pinions 34 meshing with an inner sun gear 36 or central pinion and with an outer sun gear 38 or outer ring gear, the inner sun gear 36 and outer ring gear 38 being coaxial to the X axis of the turbomachine. Each satellite pinion 34 is mounted freely rotatable around a pivot 40 and the pivots 40 are integral with a planet carrier 42. In a planetary reduction gear, the centre pinion 36 is rotationally fixed to shaft 30 of the low-pressure compressor 18 which forms an input of a gear train, the planet carrier 42 is fixed and the outer ring gear 38 is made integral with the fan wheel 12 and forms a speed reduction output of the epicyclic gear train. The housing 44 of the turbomachine externally delimits an annular enclosure 46 in which the gear train is mounted.

Figure 3A:
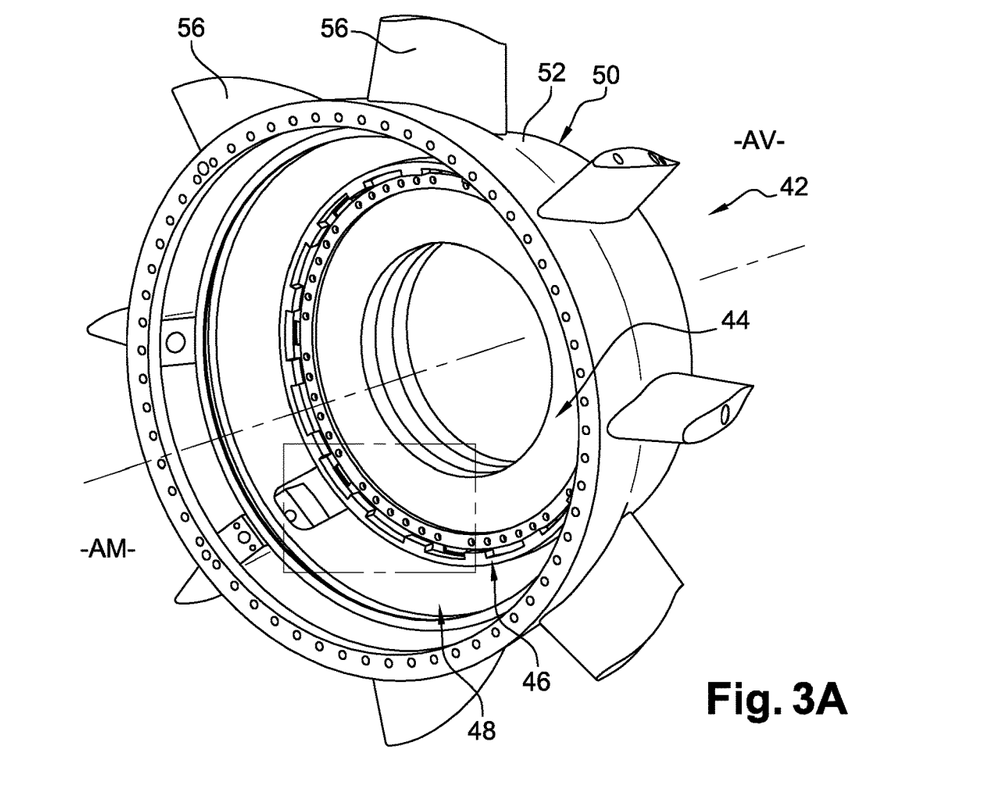
FIG. 3A shows a perspective schematic cross-sectional view of an upstream part of a double-flow turbomachine of a known type and comprising a gear train as shown in FIG. 2.
Figure 3B:
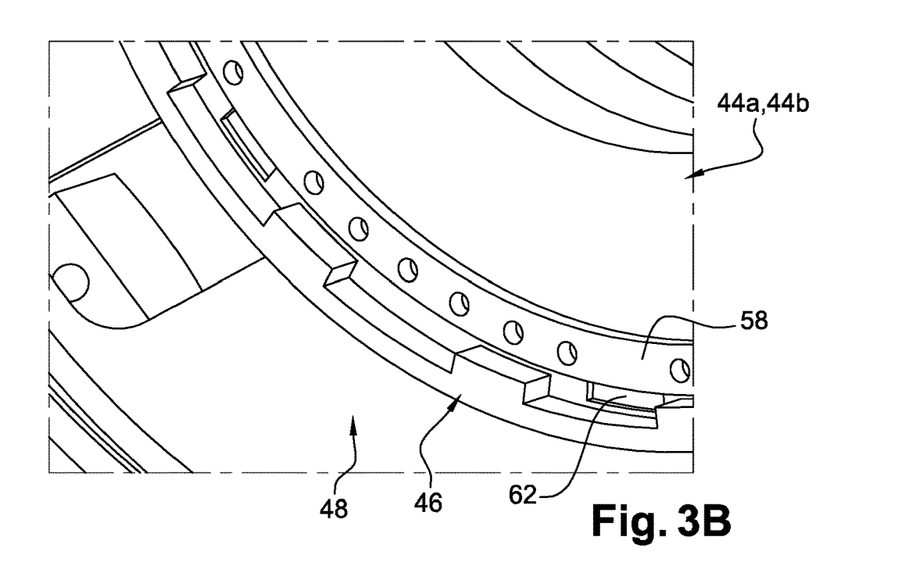
FIG. 3B is a larger scale schematic view of the dotted area in FIG. 3A.

FIG. 3A shows an assembly 42 according to the invention for connecting the outer sun gear 38 to the stator of the turbomachine, more particularly to the housing. This assembly 42 consists of a first annular part 44, a second annular part 46 and a third annular part 48. As can be seen in this figure, assembly 42 comprises an annular housing 50, which here is the intermediate housing axially separating the low-pressure compressor from the high-pressure compressor. Intermediate housing 50 comprises an inner annular shell 54 whose radially outer face delimits radially inwardly the primary annular flow path of the primary air stream flowing from the low-pressure compressor to the high-pressure compressor. This annular shell 54 carries radial arms 56 whose ends are connected to an outer annular shell 54 (not shown).

Thus, in this assembly 42, the first annular part 44, the second annular part 46 and the third annular part 48 are engaged inside the inner ring shell 52 of the housing 50. The second annular part 46 is inserted radially between the first annular part 44 and the third annular part 48. The third annular part 48 is inserted radially between the second annular part 46 and the inner annular shell 52 of the housing 50. This arrangement is clearly shown in FIG. 3A, where the upstream end is marked AM and the downstream end is marked AV.

According to one embodiment, the first annular part 44 and the second annular part 46 are each secured against rotation on the annular shell 52 of the intermediate housing 50 by means of specific circumferential locking means, i.e. first circumferential locking means for connecting the first annular part 44 to the housing 50 and second circumferential locking means for connecting the second annular part 46 to the housing 50.

According to the invention:
the first annular interlocking means are configured to allow a first circumferential clearance between the first annular part 44 and the housing 50,
the second annular interlocking means are configured to allow a second circumferential clearance between the second annular part 46 and the housing 50;
the first circumferential clearance is strictly less than the second circumferential clearance.

When the torque exceeds a certain limit, the second annular part 46 allows the forces to be transmitted, the first part 44 allows the lower torques to be transmitted. The second part 46 can thus be designed and dimensioned to take up torques above this limit value. This specific torque passage pattern is made possible by a dedicated connection of each of the first 44 and second annular part 46 to the housing 50 and by the dimensioning of the circumferential clearances as mentioned above.

To facilitate the above-mentioned operation, the first annular part 44 has an axial rigidity and a circumferential rigidity lower, respectively, than the axial rigidity and the circumferential rigidity of the second annular part 46.

This will become apparent from the description of the first annular part 44 and the second annular part 46.

In an embodiment of the invention, the first circumferential clearance may be between 0 and 0.2 mm and preferably less than 0.1 mm. The second circumferential clearance may be between 0.5 and 2 mm.

Figures 4A, 4B:
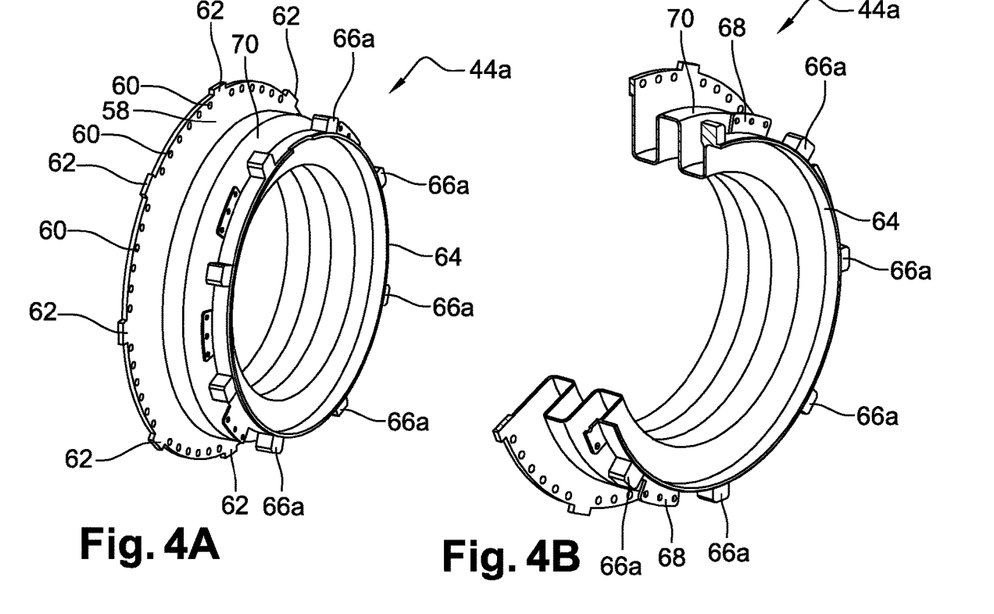
Figure 5:
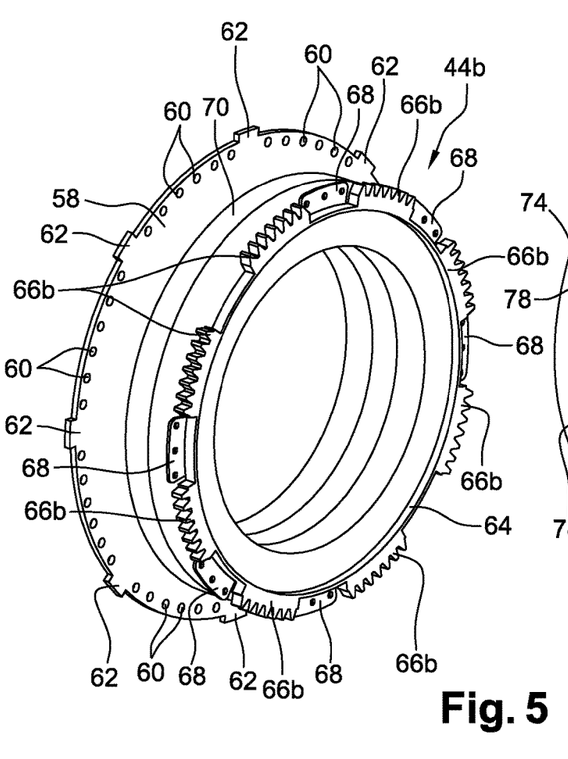
FIG. 5 is a perspective schematic view of a second embodiment of the first annular part.

FIGS. 4A and 4B represent a first embodiment of the first annular part 44a and FIG. 5 represents a second embodiment of the same part 44b.

In the first embodiment of the first annular part 44a shown in FIGS. 4A and 4B, this comprises a radial upstream annular flange 58 having bores 60 for bolting the first annular part to the gear train such as a reduction gear. This flange 58 also has a plurality of radial projections 62 evenly distributed circumferentially around the axis of the turbomachine. The first annular part 44a also comprises a downstream cylindrical wall 64 carrying on its radially outer face teeth 66a which are part of the first means of interlocking, these teeth 66a being evenly distributed circumferentially. The downstream cylindrical wall 64 also includes radial flange sectors 68 arranged circumferentially between some of the interlocking teeth and having holes for bolting onto corresponding radial flange sectors 94 of the third part 48 as shown later in connection with FIG. 10.

The first annular part 44a also has an annular bulge 70 extending radially outwards and having a rectangular cross-sectional shape. This bulge 70 gives a radial flexibility to the first part 44a limiting the transmission of vibrations and limiting its tilting.

In the second embodiment of the first part 44b shown in FIG. 5, this differs from the first embodiment in that the interlocking teeth 66a are replaced by series of ribs 66b which are spaced circumferentially from each other. It can be seen that the second annular part 46 does not have an annular bulge, since this must allow the resumption of large torques above a threshold value permitted by the first annular part 44a, 44b.

Figure 6:
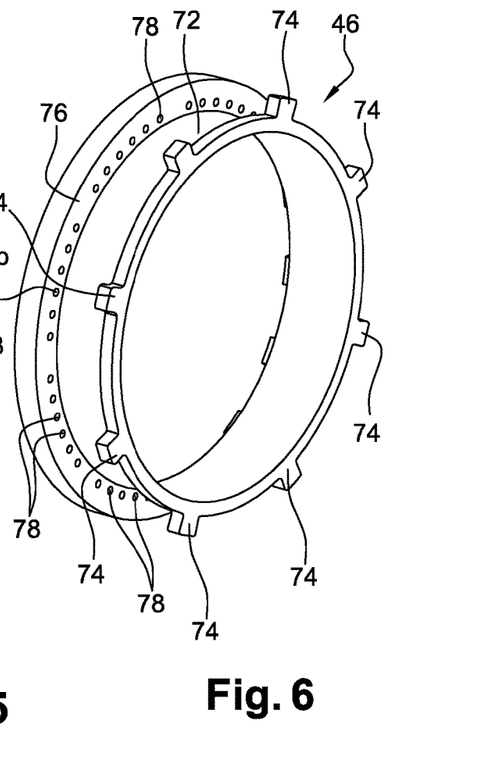
FIG. 6 is a perspective diagrammatic view of the second annular part of the assembly according to the invention.

The second annular part 46 shown in FIG. 6 comprises a cylindrical wall 72, the downstream end of which carries radially outwardly protruding teeth 74 evenly distributed circumferentially. These teeth 74 are thus part of the second interlocking means. The second annular part 46 has an annular shoulder 76 with bores 78 cooperating with the bores 60 of the upstream radial annular flange 58 of the first part 44a, 44b for their fastening together by bolting. This shoulder thus forms an annular fastening flange with the flange of the first part. In addition, the radial annular flange 58 of the first part 44a, 44b is axially locked to the annular shoulder 76 of the second part 46.

Figure 7A:
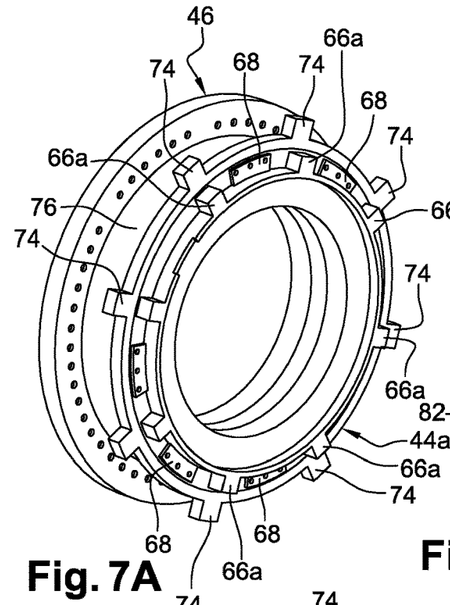
FIG. 7A is a perspective schematic view of the assembly of the first annular part according to the first embodiment shown in FIG. 4A, engaged in the second annular part shown in FIG. 6.

According to the invention, the first embodiment of the first part 44a shown in FIGS. 4A and 4B is engaged in the second part 46 shown in FIG. 6 to give the assembly shown in FIG. 7A. This assembly is engaged in housing 50a shown in FIG. 7B. For this purpose, the first means of interlocking comprise hollow parts 80a or notches formed on the inner and downstream annular periphery of housing 50a's shell 52. These notches 80a are intended to receive the teeth 66a for the interlocking of the first part 44a and thus block the rotation of the first part 44A in the housing 50a. Also, the second interlocking means comprise closed-bottomed recesses 82 formed on the housing 50 and flat in the downstream direction so as to form an axial stop for the mounting of the teeth 74 of the second part 46 in said recesses 82. This means that the first part 44a is axially locked to the second part 46, which is axially locked to the housing 50a.

Figure 7B:
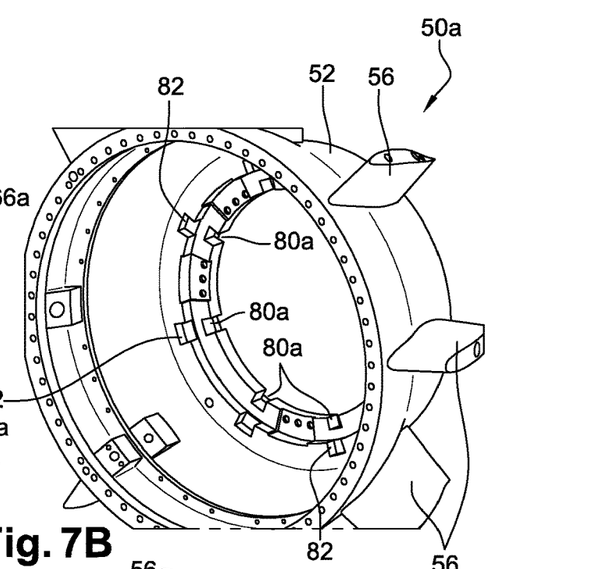
FIG. 7B is a perspective schematic view of an annular housing to accommodate the first and second annular parts shown in FIG. 7A.
Figures 8A, 8B, 9:
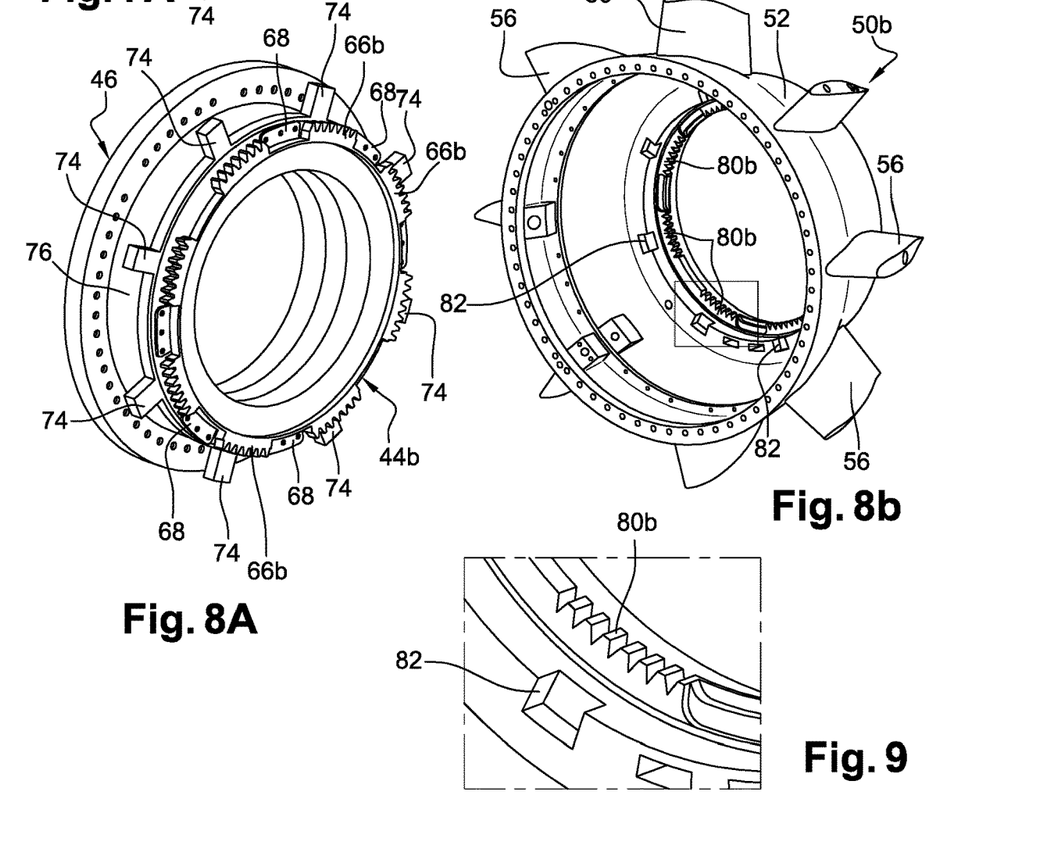
FIG. 8A is a perspective schematic view of the assembly of the first annular part according to the second embodiment shown in FIG. 5, engaged in the second annular part shown in FIG. 6.
FIG. 8B is a perspective schematic view of an annular housing to accommodate the first and second annular parts shown in FIG. 8A.
FIG. 9 is a larger scale view of the dotted area in FIG. 8B.

The second embodiment of the first part 44b shown in FIG. 5 is engaged in the second part 44b shown in FIG. 6 to give the assembly shown in FIG. 8A. This assembly is engaged in housing 50b shown in FIG. 8B. The notches 80a in FIG. 7B are here replaced by ribs 80b and cooperate in axial engagement with the ribs 66b of the first part 44b according to the second embodiment.

Figure 10:
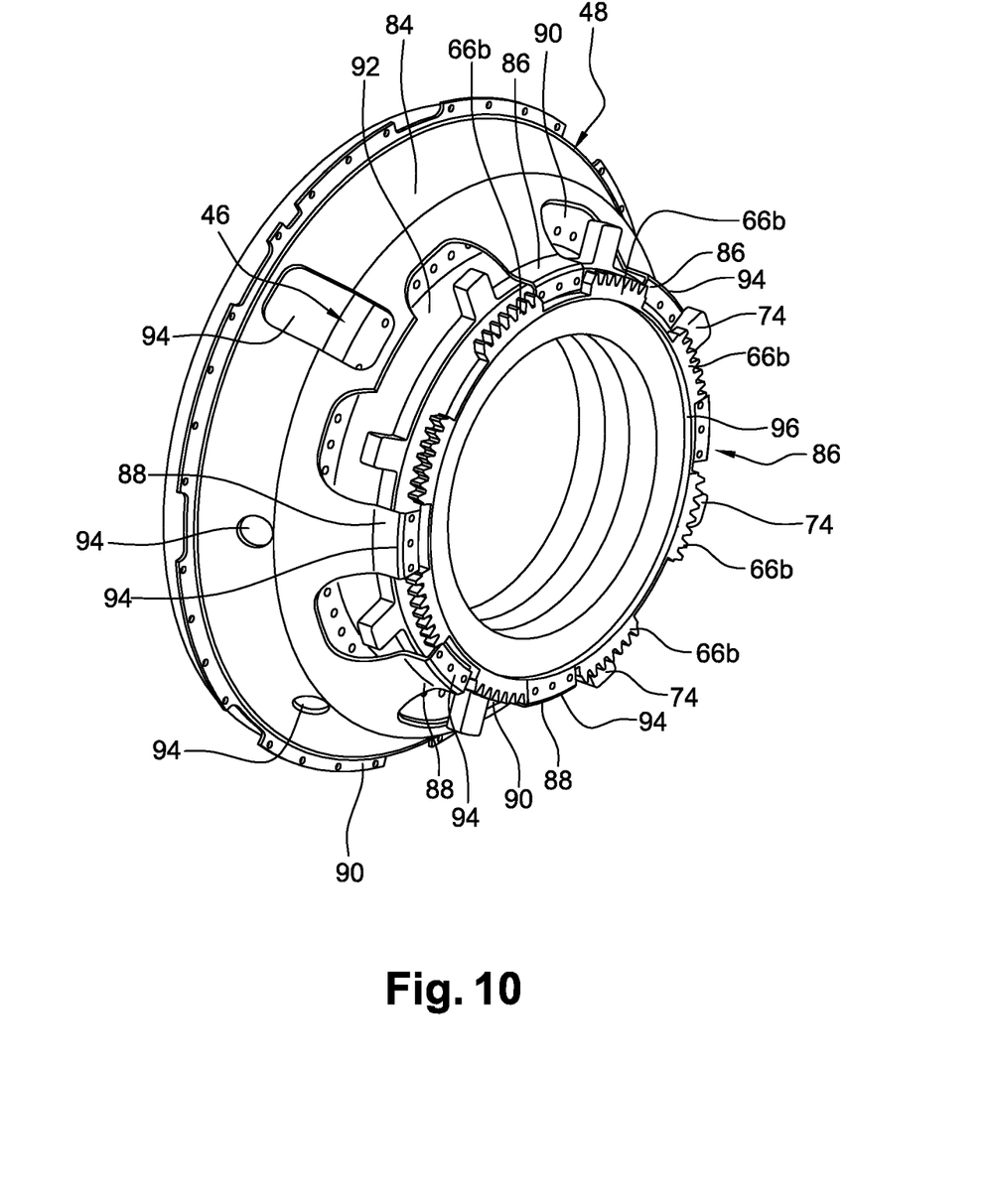
FIG. 10 is a perspective schematic view of an assembly according to the invention as seen from downstream, the annular housing having been removed to show the cooperation of the first, second and third annular parts.

The third annular part 48, shown in FIG. 10 assembled to the first part 44a according to the second embodiment, comprises a frustoconical wall 84 whose downstream end is connected to two series of arms 86, 88, each series comprising here more particularly three arms. The arms 86, 88 of each series are separated by first recesses 90 and the series are separated angularly by second recesses 92. Apertures 94 are formed in the frustoconical wall 84 and allow the passage of oil supply lines for the gear train. The downstream end of each arm 86, 88 includes a radial flange 96 for fixing, by bolting for example, on the downstream face of the first part 44b, more specifically on the radial flanges 68 of the first part 44b. As shown, when the third part 48 is mounted around the second part 46, the radial arms 90 extend between the teeth 74 of the second circumferential interlocking means of the second part 46. It is understandable that the principle of assembly and fixing of the third part 48 can be realised in an identical way with the first part 44a of the first embodiment although this is not represented.

More generally, it is preferable that the fixing of the third part 48 to the first part 44a, 44b and not to the second part 46 makes it possible to maintain a good rigidity to the assembly formed by the first part 44a, 44b, the second part 46 and the third part 48 due to the fact that the first circumferential clearance is strictly less than the second circumferential clearance. Also, it can be seen from the figures that the first part 44a, 44b is blocked or stopped axially on the second part 46, which is itself held axially in a fixed position in the housing 50, which makes it possible to maintain good axial positioning of the first part 44a, 44b relative to the second part 46 and of these two parts in the housing 50. This locking can, of course, be achieved by means other than the annular flange 58 and shoulder 76 and the closed bottom of the recesses 82 of the housing 50.

The invention claimed is:

1. An assembly for holding an epicyclic gear train in a turbomachine, the assembly comprising an annular housing in which are engaged a first annular part and a second annular part which are locked against rotation in the annular housing by first annular interlocking means and second annular interlocking means, respectively, wherein:
   the first annular interlocking means are configured to allow a first circumferential clearance between the first annular part and the annular housing;
   the second annular interlocking means are configured to allow a second circumferential clearance between the second annular part and the annular housing; and
   the first circumferential clearance is strictly less than the second circumferential clearance.

2. The assembly according to claim 1, wherein the first annular part has an axial rigidity lower than an axial rigidity of the second annular part.

3. The assembly according to claim 1, wherein the first annular part has a circumferential rigidity lower than a circumferential rigidity of the second annular part.

4. The assembly according to claim 1, wherein the first annular part has an axial rigidity and a circumferential rigidity lower, respectively, than an axial rigidity and a circumferential rigidity of the second annular part.

5. The assembly according to claim 1, wherein the first annular part comprises at least one annular bulge formed axially between the first annular interlocking means and an opposing annular flange for attachment to an outer sun gear of an epicyclic gear train.

6. The assembly according to claim 1, wherein the first annular part and the second annular part are fixed to each other by annular flanges.

7. The assembly according to claim 6, wherein the annular flanges are axially opposite to the first annular interlocking means and the second annular interlocking means.

8. The assembly according to claim 1, wherein the first circumferential clearance is between 0 and 0.2 mm.

9. The assembly according to claim 8, wherein the second clearance is between 0.5 and 2 mm.

10. The assembly according to claim 1, wherein the first annular interlocking means comprises:
   a first plurality of series of axial ribs, each of the first series being circumferentially spaced and formed on one of the first annular part and the annular housing.

11. The assembly according to claim 10, wherein each of the first series is circumferentially spaced and formed on the first annular part.

12. The assembly according to claim 10, wherein each of the first series is circumferentially spaced and formed on the annular housing.

13. The assembly according to claim 10, wherein the first annular interlocking means comprises:
   a second plurality of series of axial ribs, each of the second series being circumferentially spaced and formed on one of the first annular part and the annular housing.

14. The assembly according to claim 1, wherein the second annular part is radially interposed between the first annular part and an annular shell of the annular housing.

15. The assembly according to claim 1, further comprising a third annular part interposed annularly between the second annular part and the annular housing.

16. The assembly according to claim 15, wherein the third annular part comprises axial arms fixed by bolting to the first annular part.

17. A housing assembly comprising the assembly for holding an epicyclic gear train in a turbomachine according to claim 1, further comprising an epicyclic gear train comprising an outer sun gear and planet gears, the planet gears meshing with the outer sun gear.

18. The housing assembly according to claim 17, wherein the epicyclic gear train further comprises an inner sun gear, the planet gears meshing with the inner sun gear.

19. The housing assembly according to claim 18, wherein the inner sun gear, the outer sun gear, and the planet gears are each rotatably mounted on a planet carrier.

20. A gas turbomachine for aircraft comprising the housing assembly according to claim 19, wherein a central pinion of the epicyclic gear train is rotationally integral with a shaft of a compressor of the gas turbomachine.

* * * * *